United States Patent [19]

Kato et al.

[11] Patent Number: 5,742,138
[45] Date of Patent: Apr. 21, 1998

[54] CONTROL METHOD FOR SERVO SYSTEM WITH ADJUSTABLE SOFTNESS IN RECTANGULAR COORDINATE SYSTEM

[75] Inventors: Tetsuaki Kato, Hadanoshi; Yukinobu Tsuchida, Oshino-mura, both of Japan

[73] Assignee: Fanuc Ltd., Yamanashi, Japan

[21] Appl. No.: 732,409

[22] PCT Filed: Feb. 15, 1996

[86] PCT No.: PCT/JP96/00329

§ 371 Date: Oct. 21, 1996

§ 102(e) Date: Oct. 21, 1996

[87] PCT Pub. No.: WO96/26473

PCT Pub. Date: Aug. 29, 1996

[30] Foreign Application Priority Data

Feb. 21, 1995 [JP] Japan .................................. 7-055189

[51] Int. Cl.$^6$ ........................................ G05B 19/00
[52] U.S. Cl. .................. 318/568.18; 318/570; 318/571; 318/568.17; 901/9; 364/474.06; 364/474.03
[58] Field of Search ...................... 318/560–696; 364/474.03–474.3; 901/3, 7, 9, 12, 13, 18, 20–45; 395/80–90

[56] References Cited

U.S. PATENT DOCUMENTS

| | | | |
|---|---|---|---|
| 4,589,810 | 5/1986 | Heindl et al. | 901/4 |
| 4,629,629 | 12/1986 | David | 426/482 |
| 4,816,733 | 3/1989 | Sakakibara et al. | 318/568 |
| 4,956,594 | 9/1990 | Mizuno et al. | 318/568.1 |
| 4,969,108 | 11/1990 | Webb et al. | 364/513 |
| 4,979,127 | 12/1990 | Mizuno et al. | 364/167.01 |
| 5,179,514 | 1/1993 | Rastegar et al. | 364/167.01 |
| 5,194,791 | 3/1993 | Cull | 318/568.1 |
| 5,194,792 | 3/1993 | Hara | 318/568.13 |
| 5,373,221 | 12/1994 | McGee et al. | 318/568.11 |
| 5,451,850 | 9/1995 | Karakama | 318/568.11 |
| 5,457,367 | 10/1995 | Thorne | 318/568.11 |
| 5,646,493 | 7/1997 | Hara et al. | 318/568.17 |

FOREIGN PATENT DOCUMENTS

| | | |
|---|---|---|
| 2-300808 | 12/1990 | Japan . |
| 4-104315 | 9/1992 | Japan . |
| 4-267409 | 9/1992 | Japan . |
| 6-332538 | 12/1994 | Japan . |
| 7-20941 | 1/1995 | Japan . |
| 7-210251 | 8/1995 | Japan . |

*Primary Examiner*—Paul Ip
*Attorney, Agent, or Firm*—Staas & Halsey

[57] ABSTRACT

A control method for a servo system capable of adjusting softness to provide a robot with a soft floating function for each axis of a rectangular coordinate system. A force (Fx, Fy, Fz) acting on a tool center point in the rectangular coordinate system $\Sigma_0$ is obtained using a position error in the rectangular coordinate system $\Sigma_0$ and set parameters (Kx, Ky, Kz). The obtained force (Fx, Fy, Fz) is transformed into data ($Fx^{(n+1)}$, $Fy^{(n+1)}$, $Fz^{(n+1)}$) in a tool coordinate system $\Sigma_{n+1}$, using posture data of the robot. Further, according to the Newton-Euler method, premising ($Fx^{(n+1)}$, $Fy^{(n+1)}$, $Fz^{(n+1)}$) = ($fx^{(n+1)}$, $fy^{(n+1)}$, $fz^{(n+1)}$), a torque Ti for each axis is calculated to obtain an input value $Ei=Ti/(Kp \cdot Kv)$ for a position loop. The input value Ei is input to the position loop to perform the position loop process, and an output of the position loop process is input to a velocity loop process to perform the velocity loop process, to realize the soft floating function.

5 Claims, 6 Drawing Sheets

FIG. 6

```
////////SETTING/RECTANGULAR COORDINATES SOFT FLOAT////////

1   SOFTNESS IN THE DIRECTION OF  X AXIS    : 200  g/cm
2   SOFTNESS IN THE DIRECTION OF  Y AXIS    : 200  g/cm
3   SOFTNESS IN THE DIRECTION OF  Z AXIS    : 500  g/cm
```

FIG. 7

```
/////////PROGURAM FOR FITTING/////////////////////

1:   RESPECTIVE AXES POSITION [1] 100% POSITIONING
2:   CLOSE HAND
3:   START RECTANGULAR COORDINATES SOFT FLOAT
4:   STRAIGHT LINE POSITION [2] 50mm/sec
5:   OPEN HAND
6:   END RECTANGULAR COORDINATES SOFT FLOAT
```

FIG. 8

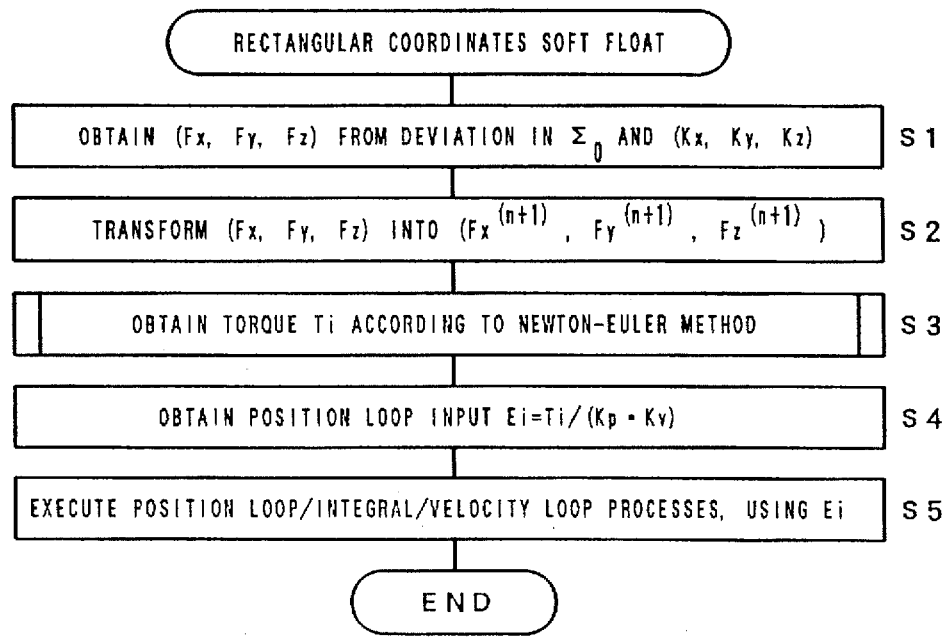

CONTROL METHOD FOR SERVO SYSTEM WITH ADJUSTABLE SOFTNESS IN RECTANGULAR COORDINATE SYSTEM

TECHNICAL FIELD

The present invention related to a control technology of an industrial robot, and more particularly to a control technology capable of modifying or variably setting, at need, softness of a servo system for controlling a servomotor for driving axes of a robot.

BACKGROUND ART

Respective axes of servomotors for driving the arm of a robot are usually controlled by a servo system having a position control loop and a velocity control loop. FIG. 1 of the accompanying drawings is a block diagram showing the servo system, in which reference numeral 1 designates a term of a position loop gain Kp and 2 designates a term of a velocity loop gain Kv. Further, 3 and 4 designate terms of a transfer function of a servomotor; Kt, a torque constant; and J, inertia. In addition, 5 designates a transfer function for obtaining a motor position q by integrating a motor velocity v. s represents Laplace operator.

A position error e is calculated from a motion command r produced in a robot controller, and the motor position q, and the position error e is multiplied by the position loop gain Kp to output a velocity command vc. Further, a velocity error ev is calculated from the velocity command vc and the motor velocity v, and the velocity error ev is multiplied by the velocity loop gain Kv to output a torque command tc. Then, a driving current in accordance with the torque command tc is supplied to the servomotor. In the velocity loop control, PI (proportional and integral) control may be adopted in place of (proportional) control.

When a tool center point of the robot, whose motors for respective axes are controlled by the above-mentioned servo system (PI control), is encountered and comes into contact with any obstruction in moving toward a target position, it will attempt to continue moving toward the target position against the obstruction.

This phenomenon is explained as follows; Although the servo motor attempts to move toward the target position irrespective of presence of the obstruction, actually it is blocked from reaching the target position so that the position error e increases. As a result, the velocity command vc, which is obtained by multiplying the position error e by the position gain Kp, also increases. The deference between the increased velocity command vc and the actual motor velocity v (the velocity v is assumed to be near "0" when it is in contact with the obstruction) increases as integrated by an integrator in the velocity loop, so that the torque command tc becomes a large value. As a result, the servomotor outputs a maximum torque as it attempts to realize the movement toward the target position, to make a cause of a stop of the robot or an accident (interference accident) of breaking a workpiece, an end effector, etc.

For avoiding the foregoing inconvenience, there is adopted a servo system in which increases of the velocity command vc and the torque command tc are restrained by lowering the position loop gain Kp and the velocity loop gain Kv when necessary. In this servo system, generally, gain values Kp' and Kv' for softness control are previously set and are substituted for Kp and Kv, respectively, when a softness control command is input.

In this conventional servo system, "a soft floating function on the space of each robot axis (hereinafter referred to each axis)" is realized by modifying or variably setting the softness of the servo system for each axis.

For example, if Kp' and Kv' are set to be very small with respect to three axes of the wrist of the robot, a servo system particularly soft in three axes of the wrist is realized. If Kp' and Kv' are set to be very small for all axes, the servo system is very soft in all the axes.

However, in the above conventional method, since the softness of the servo system can be adjusted only for each axis, it is difficult to adjust the softness independently in different directions in the working space and to give the robot a softness suitable for actual operations, such as fitting and deburring.

For example, in the fitting operation, it is desirable to perform a control by a servo system which is hard with respect to an inserting direction of a workpiece gripped by the robot, but soft with respect to the direction perpendicular to the inserting direction. However, the conventional method, which is not capable of adjusting the softness of the servo system for individual coordinate axes of a coordinate system defined in the working space, can not meet the above requirement.

In the deburring operation, it is desirable to give a different softness for each movement in two directions, i.e. a direction of an operation line and a direction perpendicular to the operation line, it is hardly possible to realize such setting of softness of the servo system by the conventional method in which softness of the system is adjusted with respect to each robot axis.

DISCLOSURE OF THE INVENTION

An object of the present invention is to provide a control method for a servo system which is capable of adjusting softness for each axis of a rectangular coordinate system defined in a working space, to provide a robot with a soft floating function in the rectangular coordinate system, thereby improving accuracy and safety of operations with the robot.

The method of the present invention gives a soft floating function in the direction of each axis of a rectangular coordinate system to a servo system which executes processes including a position loop process and a velocity loop process in order to control a servomotor for driving each axis of a robot.

First, a set of parameters representing the softness of the servo system is set with respect to each axis of the rectangular coordinate system defined in a working space. The parameters are set, for example, by inputting values through a manual input device with a display equipped with a robot controller. When the soft floating function is in effect, a force acting on a tool center point in the rectangular coordinate system is calculated from the set parameters and a position error in the rectangular coordinate system.

Then, a torque Ti (i=1, 2, ..., n, where n is the number of axes of the robot) for each axis is obtained based on the calculated force according to inverse dynamics, and a value Ei to be input to a position loop is calculated based on the torque Ti, a gain Kp of the position loop process and a gain Kv of the velocity loop process. The softness designated in the rectangular coordinate system is realized by inputting the input value Ei to the position loop for each axis to perform the position loop process and the velocity loop process. The softness is adjusted by modification/setting of the set of parameters. The input value Ei to the position loop can be calculated by dividing the torque Ti (i=1, 2, ..., n, where n is the number of the robot axes) by the product of the gain of Kp the position loop process and the gain Kv of the velocity loop process.

In a case where it is necessary to take effect of gravity into consideration, the output of the position loop process is integrated with a predetermined integral gain and added to the output of the velocity loop process, to output a torque command. At that time, the control system is prevented form losing the softness by placing a fixed limitation on the quantity to be added to the output of the velocity loop process.

BRIEF DESCRIPTION OF DRAWINGS

FIG. 6 is a diagram showing a screen for designating softness in the direction of each axis of a rectangular coordinate system;

FIG. 7 shows one example of operating program using a soft floating function in a rectangular coordinate system for performing the fitting operation as shown in FIG. 5; and FIG. 8 is a flowchart showing an outline of processing when the soft floating feature is in effect according to the present invention.

BEST MODE FOR CARRYING OUT THE INVENTION

Figure 1:
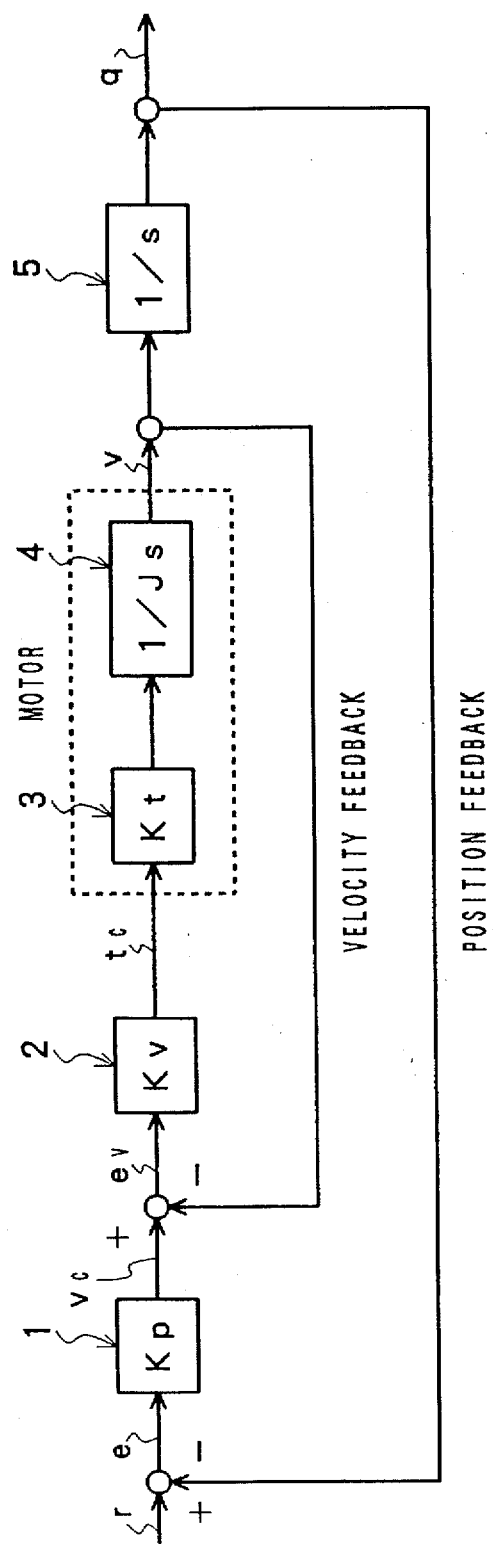
FIG. 1 is a block diagram showing an arrangement of a conventional servo system.

The present invention expands a soft floating function in a servo system for controlling a servomotor for driving each axis of a robot. Namely, according to the present invention, a servo system capable of specifying softness with respect to each axis of a rectangular coordinate system is constructed, to realize "a soft floating function in a rectangular coordinate system". The summary of the principles of the invention is described as follows:

First, for preparation, conversion between a command posture and a current posture is represented in terms of rotation about a fixed axis. In the following equations, $(u_x, u_y, u_z)^T$ is a unit vector in the direction of this fixed axis, and $\theta$ is an angle of rotation.

The softness of robot motion control in a rectangular coordinate system (O-XYZ) can be expressed by the following equations.

$$Kx(xd-x)=Fx \quad (1)$$

$$Ky(yd-y)=Fy \quad (2)$$

$$Kz(zd-z)=Fz \quad (3)$$

$$Kx'\theta\, u_x = Nx \quad (1')$$

$$Ky'\theta\, u_y = Ny \quad (2')$$

$$Kz'\theta\, u_z = Nz \quad (3')$$

wherein

Kx, Ky, Kz: parameters representing degree of softness with respect to directions of the individual axes X, Y, Z;

Kx', Ky', Kz': parameters representing degree of softness with respect to rotation about the individual axes X, Y, Z;

xd, yd, zd: a position command (components of the individual axes X, Y, Z) in the rectangular coordinate system;

x, y, z: a feedback (components of the individual axes X, Y, Z) in the rectangular coordinate system;

Fx, Fy, Fz: a force acting on a tool center point (components of the individual axes X, Y, Z of a force for moving to a position designated by the position command); and Nx, Ny, Nz: a moment acting on the tool center point (components about the individual axes. X, Y, Z of a moment for taking a posture designated by the posture command);

Therefore, in order to realize a soft floating function in the rectangular coordinate system, it is sufficient to construct a servo system which performs a softness control of each robot axis so that values of the parameters Kx, Ky, Kz and Kx', Ky', Kz' in the equations (1) through (3) and (1') through (3') are kept at constant values (variably set values) when the robot is in operation.

The equations (1) through (3) and (1') through (3') show that the force (Fx, Fy, Fz) and the moment (Nx, Ny, Nz) on the tool tip point are represented by the parameters Kx, Ky, Kz and, Kx', Ky', Kz' and the position and moment deviations in the rectangular coordinate system.

Using Newton-Euler method (also cared algorithm of Luh), which is well known as algorithm of inverse dynamics, a necessary torque $\tau i$ (i=1, 2, ..., n; where n is the number of axes of the robot) on each axis of the robot based on the force (Fx, Fy, Fz) and the moment (Nx, Ny, Nz) acting on the tool center point.

Newton-Euler method is described in detail in, for example, "Robotics for Mechanical System", written by Shigeki Tohyama and published by Sogo Electronics Publishing Co. Ltd., 2nd issue of May 30, 1991, pp. 55–65, and hence the detailed description is omitted here. Only the conclusion part of the algorithm to be used is described below. This algorithm is composed of an initialization, a forward routine and a backward routine.

In the forward routine, kinematical data of each link is calculated, from a base coordinate system $\Sigma 0$ toward an end of a robot hand. On the other hand, in the backward routine, a force/moment acting on each link is calculated, from the end of the robot hand toward the base coordinate system $\Sigma 0$.

Initialization:
$\omega_0 = \dot{\omega}_0 = 0$
$\dot{v}_0 = g = (g_x, g_y, g_z)$
$z_0 = (0, 0, 1)$ Forward routine: $(i = 1, 2, \ldots, n)$
$\omega_i^{(i)} = R_i^T(\omega_{i-1}^{(i)} + z_0 \dot{q}_i)$ (revolving axis)
$\omega_i^{(i)} = R_i^T \omega_{i-1}^{(i-1)}$ (axially moving axis)
$\dot{\omega}_i^{(i)} = R_i^T(\dot{\omega}_{i-1}^{(i-1)} + z_0 \ddot{q}_i) + \omega_{i-1}^{(i-1)} \cdot z_0 \dot{q}_i$
(revolving axis)
$\dot{\omega}_i^{(i)} = R_i^T(\dot{\omega}_{i-1} - 1^{(i-1)})$ (axially moving axis)
$\dot{v}_i^{(i)} = \dot{\omega}_i^{(i)} \cdot p_i^* + \omega_i^{(i)}(\omega_i^{(i)} \cdot p_i^*) + R_i^T \dot{v}_{i-1}^{(i-1)}$
(revolving axis)
$\dot{v}_i^{(i)} = R_i^T(z_0 \ddot{q}_i + \dot{v}_{i-1}^{(i-1)}) + \dot{\omega}_i^{(i)} \cdot p_i^* + 2\omega_i^{(i)}(R_i^T z_0 \dot{q}_i) + \omega_i^{(i)}(\omega_i^{(i)} \cdot p_i^*)$
(axially moving axis)
$\dot{v}_i^{(i)} = )\dot{\omega}_i^{(i)} \cdot \bar{s}_i^{(i)} + \omega_i^{(i)}(\omega_i^{(i)} \cdot \bar{s}_i^{(i)}) + \dot{v}_i^{(i)}$
$F_i^{(i)} = m_i \times \dot{v}_i^{(i)}$
$N_i^{(i)} = I_i \cdot \dot{\omega}_i^{(i)} + \omega_i^{(i)} \cdot I_i \omega_i^{(i)}$
Backward routine: $(i = n, n-1, \ldots, 1)$
$f_i^{(i)} = R_{i+1} f_{i+1}^{(i+1)} + F_i^{(i)}$
$n_i^{(i)} = R_{i+1} n_{i+1}^{(i+1)} + p_i^* \cdot R_{i+1} f_{i+1}^{(i+1)} +$ -continued $$(p_i^* + \bar{s}_i^{(i)})F_i^{(i)} + N_i^{(i)}$$
$$\tau_i = n_i^{(i)}R_i^T z_0 + b_i \dot{q}_i \text{ (revolving axis)}$$
$$\tau_i = f_i^{(i)}R_i^T z_0 + b_i \dot{q}_i \text{ (axially moving axis)}$$

where $n_i^{(i)}$: a torque given from a link driven by (i–1)th axis (hereinafter referred to the link i–1) to a link i, expressed on a coordinate system $\Sigma_i$ set on i-th axis;

$f_i^{(i)}$: a force given from the link i, expressed on the coordinate system $\Sigma_i$;

$F_i^{(i)}$: a vector of an external force given on the link i, expressed on the coordinate system $\Sigma_i$;

$N_i^{(i)}$: a vector of moment given to the link i, expressed on the coordinate system $\Sigma_i$;

$R_i$: a principal 3×3 matrix of a coordinate system transformation matrix $A_i$, representing rotation. The coordinate system transformation matrix $A_i$ is a matrix for coordinate transformation from the coordinate system $\Sigma_i$ which is set on i-th axis, into the coordinate system $\Sigma_{i-1}$ which is set on (i–1)th axis. The coordinate system $\Sigma_0$ is a base coordinate system coincide with the above-mentioned rectangular coordinate system;

$P_i^*$ a position vector from an origin of the coordinate system $\Sigma_{i-1}$ to an origin of the coordinate system $\Sigma_i$, expressed on the coordinate system $\Sigma_i$;

g: a vector of gravity;

$s_i$: a position vector indicating the centroidal position of the link i, expressed on the coordinate system $\Sigma_i$;

$I_i$: an inertial moment about the centroid of the link i, expressed on the coordinate system $\Sigma_1$;

$z_0$: a unit vector in the direction of Z axis of the coordinate system $\Sigma_0$, which is expressed as (0, 0, 1) on the coordinate system $\Sigma_0$;

$b_i$: a viscosity resistance of i-th joint axis;

$q_i$: an axis variable of i-th joint axis and it may be assumed $q_i=\theta_i$ (angle of link i); and $\omega, \dot{\omega}$: an angular velocity and an angular acceleration of the link i, expressed on the coordinate system $\Theta_0$.

Various quantities used in the above-mentioned algorithm are calculated from structural parameters, and position, velocity and acceleration of each axis.

Fx, Fy, Fz and Nx, Ny, Nz determined according to the equations (1) through (3) and (1') through (3') are incorporated into $f_{n+1}^{(n+1)}$ and $n_{n+1}^{(n+1)}$ in the above-mentioned algorithm. Namely, by defining the coordinate system $\Sigma_{n+1}$ to be a tool coordinate system, $f_{n+1}^{(n+1)}$ and $n_{n+1}^{(n+1)}$ are considered to represent a force and a moment acting on the origin of the tool coordinate system (i.e. tool center point) on the tool coordinate system $\Sigma_{n+1}$.

The force F(Fx, Fy, Fz) acting on the tool center point on the base coordinate system $\Sigma_0$ can be expressed on the tool coordinate system $\Sigma_{n+1}$ by a matrix arithmetic U·F, when current data representing a posture of the tool coordinate system $\Sigma_{n+1}$ with respect to the base coordinate system $\Sigma_0$ is expressed by a matrix U and the force (Fx, Fy, Fz) is expressed as follows:

$$F=(Fx, Fy, Fz)^T=(Fx^{(0)}, Fy^{(0)}, Fz^{(0)})^T$$

With an expression of the force F(Fx, Fy, Fz) on the tool coordinate system $\Sigma_{n+1}$: $F^{(n+1)}=(Fx^{(n+1)}, Fy^{(n+1)}, Fz^{(n+1)})^T$, it can be expressed that $f_{(n+1)}^{(n+1)}=F^{(n+1)}$.

Figure 2:
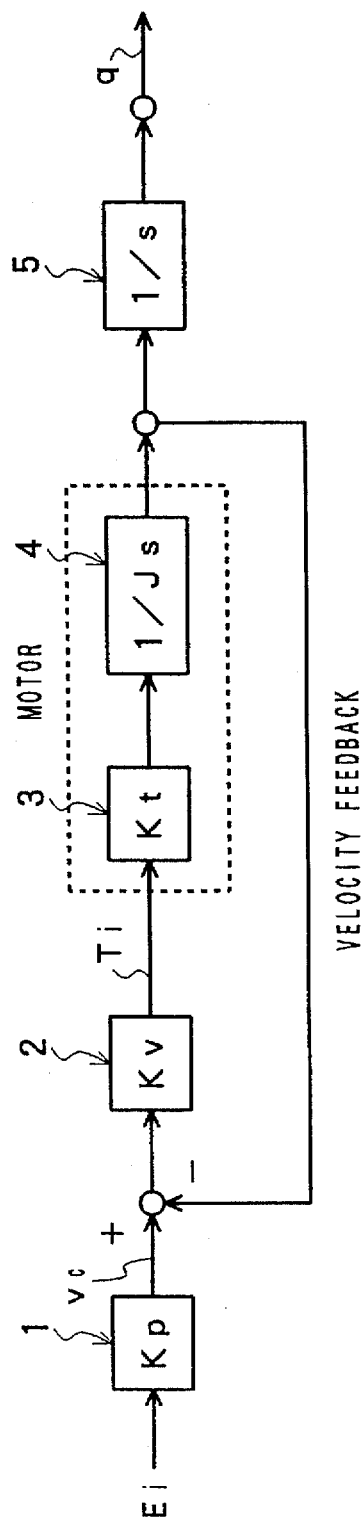
FIG. 2 is a block diagram of a servo system according to the present invention, when gravity is not taken into consideration.

Assuming that $T_i$ represents a torque $\tau_{i\,(g=0)}$ of the axis i, which is obtained by the above-mentioned algorithm on condition of neglecting the gravity, i.e. g=(0, 0, 0), the servo system of the axis i is expressed by the following equation.

$$Kp \cdot Kv \cdot Ei = Ti \tag{5}$$

where Kp is a position loop gain, Kv is a velocity loop gain, and Ei is an input of position loop for the axis i. FIG. 2 is a block diagram showing this servo system in the same manner as in FIG. 1. (Although Kp and Kv are used commonly for the individual axes for convenience' sake, Kpi and Kvi may be used as substitute for Kp and Kv if they are set for each axis.) FIG. 2 is different from FIG. 1 in that the input to the position bop is Ei instead of e. Namely, the input Ei to the position loop for each axis is not determined by the position error e between a position command r and a position feedback q for the axis i, as in the conventional servo system (FIG. 1).

This Ei is calculated based on the torque Ti, the position loop gain Kp and the velocity loop gain Kv, for each axis. The torque Ti is obtained by the reverse dynamics based on the force F and the movement N, which are calculated from sets of parameters Kx, Ky, Kz and Kx', Ky', Kz' representing the softness of the servo system in the rectangular coordinate system, the position deviation (xd–x), (yd–y) and (zd–z), and the posture deviation in the rectangular coordinate system.

In other Words, Ei is regarded as a value obtained by modifying a position error e for each axis in accordance with the softness to be given to the servo system for the robot axis, to realize the softness represented by parameters Kx, Ky, Kz and Kx', Ky', Kz' in the rectangular coordinate system. E is expressed by the following equation (6):

$$E=Ti/(Kp \cdot Kv) \tag{6}$$

The necessary torque Ti is generated for realizing the softness in the rectangular coordinate system, which is expressed by the equations (1)–(3) and (1')–(3'), by inputting Ei determined by the above equation (6) to the position loop for each axis.

Next, the effect of gravity is taken into consideration. A control taking account of the effect of gravity can be achieved by adding an integrator to the servo system as shown in FIG. 2. Such control system is shown in FIG. 3 in the similar manner as in FIG. 2.

Figure 3:
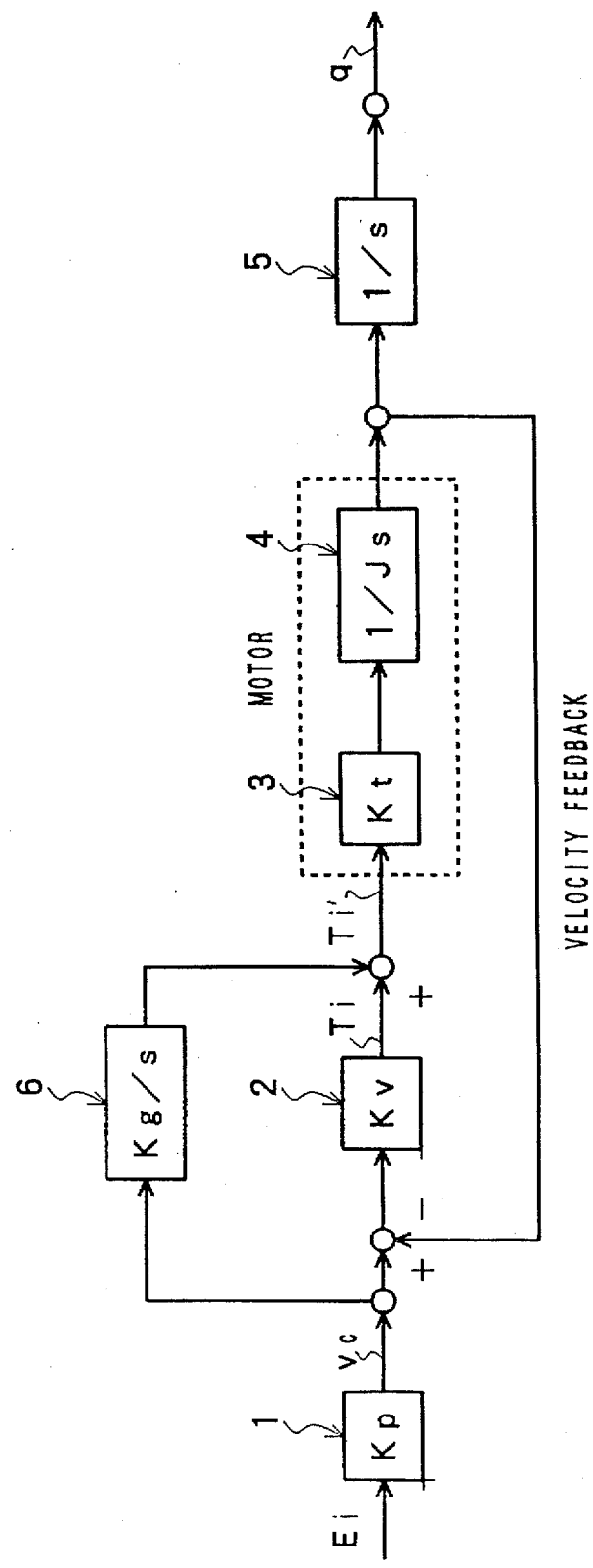
FIG. 3 is a block diagram of a servo system according to the present invention, when gravity is taken into consideration.

In FIG. 3, likewise FIG. 2, Kp and Kv are used commonly for the individual axes for convenience' sake, Kpi and Kvi may be used as substitute for Kp and Kv if they are set for each axis. The difference between FIG. 3 nd FIG. 2 resides in that an integral term 6 (Kg/s; Kg is a gain of the integrator) is provided so as to compensate a gravity component for the velocity command vc, which is an output of the position loop with an input of Ei, and the integrated value is added to a torque Ti which is calculated by the velocity loop processing with an input of the velocity command vc.

This integral term 6 serves as means for avoiding inadequateness of a vertically upward torque. For example, when the axis Z of the rectangular coordinate system is set vertically upward and Kz is set small (i.e., softness is large), Ti is not enough to surpass the gravity in the absence of the integral term 6, which might cause a drop of the arm. In the provision of the integral term 6, although Ti is not enough to surpass the gravity, a torque Ti' increases according to the gain Kg, to generate adequate torque.

Since a torque component for gravity tends to stay in the integrator represented by the integral term 6, it is necessary to limit the output of the integrator to a constant value. If the output is not limited, a force exceeding an external force stays in the integrator to cause a forced movement toward the commanded position for the axis, losing the softness.

Accordingly, the following limit is set when the soft floating function is in effect, with I GR which represents the value (output) accumulated in the integrator when starting the soft floating function. The value of I SOFT-LIM is appropriately set for every axis by tuning, etc.

IF $I > I$ GR+$I$ SOFT-LIM THEN $I = I$ GR+$I$ SOFT-LIM    (7)

IF $I > I$ GR−$I$ SOFT-LIM THEN $I = I$ GR−$I$ SOFT-LIM    (8)

By constructing the servo system for each axis according to the foregoing way, it is possible to give the robot a designated softness in the rectangular coordinate system. For example, in a fitting operation with an inserting direction of the Z axis, the fitting can be performed smoothly by designating Kz and Ky to be relatively small and Kz to be relatively large. In a deburring operation, precision of the operation can be improved by individually setting Kz, Ky and Kz to appropriate values for a direction of an operation line and directions perpendicular to the operation line (e.g., directions of the Y axis and the Z axis).

Figure 4:
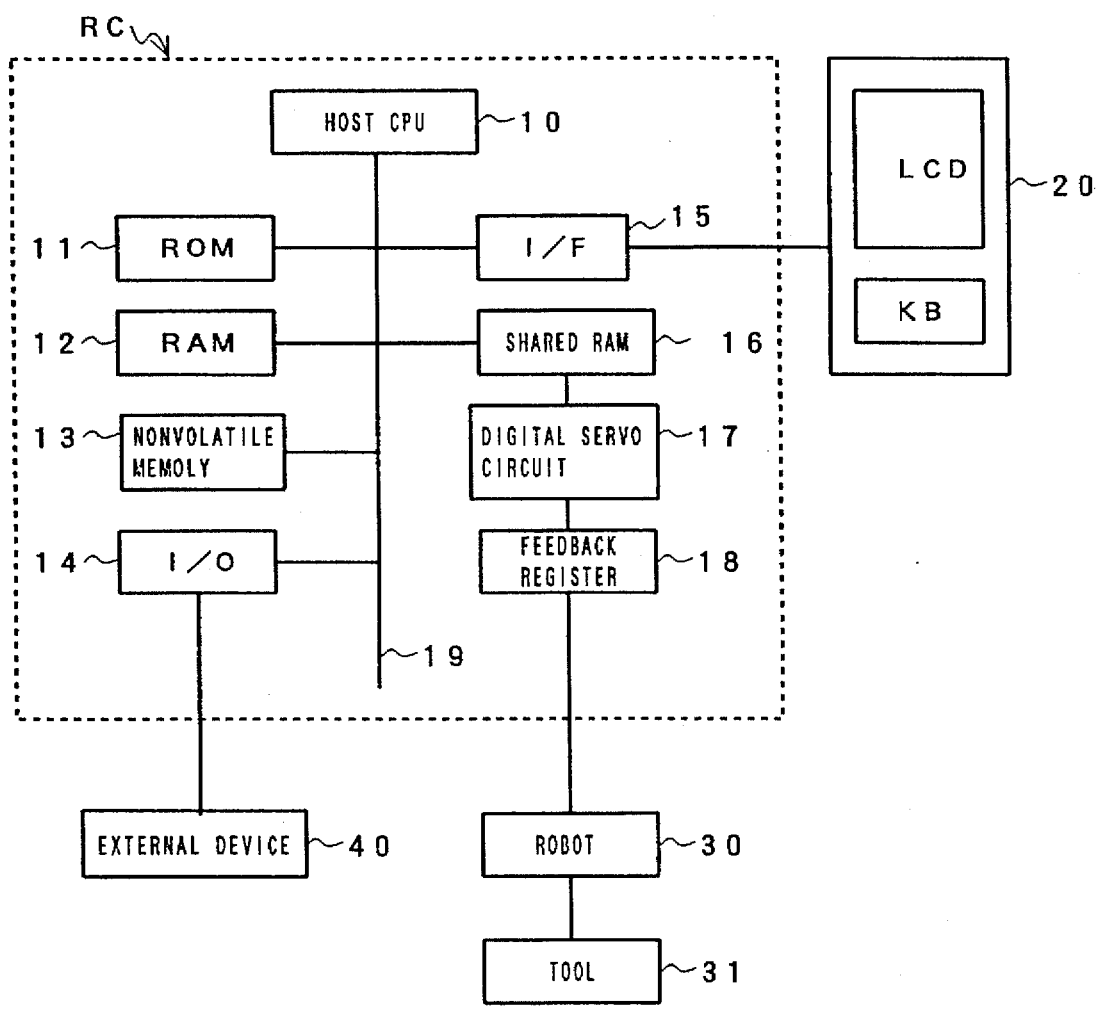
FIG. 4 is a block diagram showing a principal part of a robot controller used in an embodiment of the invention.

FIG. 4 is a block diagram showing a principal part of a robot controller RC with peripheral equipments, which are used in the embodiment of the invention. First, description is made on the part directly related with the soft floating servo control. A host computer 10 controls the whole system, and a shared RAM 18 transfers a move command and a control signal, which are output from the host computer 10, to a processor of a digital servo circuit 17, or transfers reversely various signals from the processor to the host computer 10.

The digital servo (software servo) circuit 17, comprising a processor (CPU) and memories such as ROM, RAM, executes the above-mentioned servo control. Reference numeral 18 denotes a feedback register for storing a position feedback value, a velocity feedback value, a current feedback value, etc. for servomotors for respective axes of a robot 30.

The host CPU 10 is connected with a ROM 11, RAM 12, a nonvolatile memory 13, an input-output device (I/O) 14 serving as an interface for an external device 40, such as a tape reader and a printer, and an interface (I/F) 15 for an teaching operation panel 20 via a bus line. Various kinds of system programs are stored in a ROM 11. A RAM 19 is provided for use in temporarily storage of data for the host CPU 10. Te nonvolatile memory 13 stores information, such as various kinds of programs and related set raises in relation to operations of the robot and the external device 40.

The teaching operation panel 20 is a manual input device equipped with a liquid crystal display (LCD) and a keyboard KB and is used for inputting/modifying a command of a playback operation of the program, a jog-feed command and program data, and also for inputting/modifying related set values. In this embodiment, data designating softness in the direction of X, Y, Z axes to be input referring to a screen for softness-setup, which will be described later, and values of I SOFT-LIM to be input through the teaching operation panel 20 are stored in the nonvolatile memory 13.

A tool 31 to be attached to the robot 30 is determined depending on operations to be performed by the robot 30. For example, a robot hand is attached to the robot 30 for operations to be performed by gripping a workpiece, and a deburring tool for the deburring operation.

In the following example, only the softness with respect to position (designated by Kx, Ky, Kz) is described. The softness with respect to posture (designated by Kx', Ky', Kz') is considered in the same way as the softness with respect to position.

Figure 5:
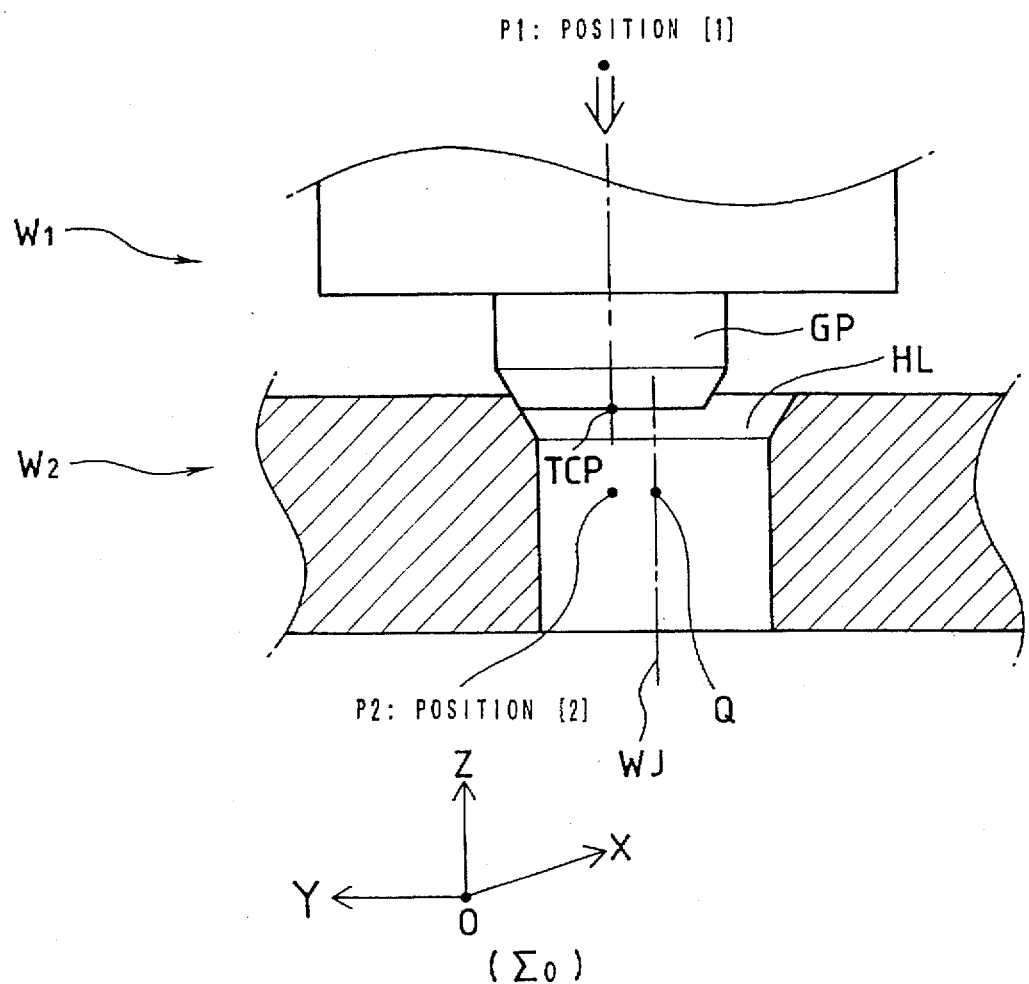
FIG. 5 is a schematic diagram showing a fitting operation to which the invention is applied.

FIG. 5 schematically illustrates an example of the fitting operation to which the present invention is applied. In FIG. 5, W1 and W2 designate two workpieces to be fit to each other. The workpiece W1 gripped by a non-illustrated robot hand is fit in a hole HL of the workpiece W2. A fitting direction coincides with the Z axis of the rectangular coordinate system $\Sigma_0$ which is already set in the robot controller RC. GP designates a guide pin provided on an end of the workpiece W1, and TCP designates a tip point of the tool.

Further, P1 and P2 represent positions which are taught as POSITION [1] and POSITION [2], respectively, in a below-described operation program. In such fitting operation, an taught line P1P2 tends to be deviated somehow from the center line of the hole HL. If a usual rigid servo control is performed for a movement from POSITION [1] to POSITION [2], TCP attempts to move along the taught line P1P2 and, as a result, the guide pin GP becomes immovable as being blocked by the mouth of the hole HL, occasionally causing an accident to damage the workpieces W1, W2 and the robot hand. According to the invention, such accident is avoided. This procedure is described below.

First, the user invokes a picture for inputting softness as shown in FIG. 6 on a screen of the LCD associated with the teaching operation panel 20. Then, the user inputs desired values individually for X axis, Y axis and Z axis of $\Sigma_0$ on the screen. When a smaller value is input a larger softness is set, and when a larger value is input a larger rigidness is set. In this example, Kx=200 g/cm for X axis; Ky=200 g/cm for Y axis; and Kz=500 g/cm for Z axis are respectively set.

FIG. 7 shows one example of operation program using the soft floating function in the rectangular coordinate system for executing the fitting operation as shown in FIG. 5.

When a playback operation of the operating program as shown in FIG. 7 is started after the input on the screen as shown in FIG. 6, the tool center point of the robot is moved to POSITION [1] by individual axis motion and is positioned there. After the hand is closed to grip the workpiece W1, the soft floating function in the rectangular coordinate system is effected and the tool center point is moved toward POSITION [2] at the commanded velocity of 50 mm/sec.

When the soft floating function in the rectangular coordinate system is made in effect, processing as shown in FIG. 8 is executed in every predetermined period to realize the soft floating function according to the above-described principle with respect to the operation. First, in Step S1, a force (Fx, Fy, Fz) in the rectangular coordinate system $E_0$ is obtained using a position error in the rectangular coordinate system $\Sigma_0$ and the set parameters (Kx, Ky, Kz). The position deviation in the rectangular coordinate system $\Sigma_0$ can be calculated from position error on respective axes according to forward kinematics. In the next step S2, the force (Fx, Fy; Fz) obtained in the rectangular coordinate system $\Sigma_0$ is converted into data ($Fx^{(n+1)}$, $Fy^{(n+1)}$, $Fx^{(n+1)}$) on the tool coordinate system $\Sigma_{n+1}$, using posture data of the robot.

Further, a torque Ti for each axis is calculated (Step S3) according to the above-mentioned Newton-Euler method, premising ($Fx^{(n+1)}$, $Fy^{(n+1)}$, $Fz^{(n+1)}$)=($fx^{(n+1)}$, $fy^{(n+1)}$, $fz^{(n+1)}$), and a position loop input Ei is calculated by Ti/(Kp·Kv) (Step S4). A position loop process having an input of the calculated position loop input Ei, an integrating process and a velocity loop process with the integrating process having an input of the output from the position loop, and a torque command creating process of summing the outputs of the integrating process and the velocity loop process are performed (Step S5) to realize the soft floating function in accordance with the setting screen of FIG. 6. The summing of the outputs of the integrating process and the velocity loop process is performed with the limits defined by the equations (7) and (8) under the set I SOFT-LIM.

Thus, after the guide pin GP of the workpiece W1 comes into contact with the upper edge of the hole HL, the tool center point TCP is smoothly moved to a point Q (corresponding to the taught position P2) on the center line WJ of the hole HL, sliding along the inner wall of the hole HL. Then, the robot hand is opened for releasing the workpiece W1 to finish the fitting operation.

In the foregoing embodiment, the parameters to designate the softness in the rectangular coordinate system is set by input on the screen. Alternatively, these parameters may, be set in the operation program. For example, for a deburring operation having a curved operation lined, an appropriate degree of softness can be set in conformity with the curved operation line by modifying the parameters in the operation program taking account of the curved line.

According to the present invention, softness can be adjusted in a rectangular coordinate system defined in a working space. By constructing the servo system for each axis according to the method of the invention, accuracy of various operations, such as fitting and deburring can be improved.

We claim:

1. A control method for a servo system for performing processes including a position loop process and a velocity loop process for each of axes of a robot so as to control servomotors for driving the axes of the robot, said method comprising the steps of:

(a) calculating a force acting on a center point of a tool mounted on said robot in a rectangular coordinate system defined in a working space based on a set of parameter values representing a degree of softness of said servo system in the direction of each coordinate axis of the rectangular coordinate system and a position deviation in the direction of each coordinate axis of the rectangular coordinate system;

(b) calculating a torque Ti (i=1, 2, ..., n, where n is the number of the robot axes) based on said force calculated in said step (a), using inverse dynamics;

(c) calculating an input value Ei based on said torque Ti calculated in said step (b) for each axis, a gain Kp of the position loop process and a gain Kv of the velocity loop process; and (d) inputting said input value Ei calculated in said step (c) to the position loop process for each axis, to perform the position loop process and the velocity loop process for each axis so that said servo system has the degree of softness in accordance with the parameter values.

2. A control method for a servo system according to claim 1, further comprising the step of integrating the output of the position loop process with a predetermined integral gain and adding the integrated value to the output of the velocity loop process with a predetermined limit, to output a torque command.

3. A control method for a servo system according to claim 1, said step (c) including the step of dividing said calculated torque Ti for each axis by a product of the gain Kp of the position loop process and the gain Kv of the velocity loop process to calculate said input value Ei.

4. A control method for a servo system according to claim 3, further comprising the step of integrating the output of the position loop process with a predetermined integral gain and adding the integrated value to the output of the velocity loop process with a predetermined limit, to output a torque command.

5. A control method for a servo system according to claims 1, 2, 3 or 4, further comprising the step of Setting and inputting the set of parameter values by manual input means having a display unit.

* * * * *